United States Patent

[11] 3,540,696

[72] Inventor Donald G. Fawkes
 Aurora, Illinois
[21] Appl. No. 750,409
[22] Filed July 5, 1968
 Division of Ser. No. 606,649, Jan. 3, 1967, now Pat. No. 3,418,411.
[45] Patented Nov. 17, 1970
[73] Assignee Henry Pratt Company,
 a corporation of Illinois

[54] VALVE SEAT STRUCTURE
 22 Claims, 18 Drawing Figs.
[52] U.S. Cl. .................................................. 251/306
[51] Int. Cl. ............................................... F16k 1/226
[50] Field of Search ........................................ 251/173, 172, 175

[56] References Cited
UNITED STATES PATENTS
2,982,305 5/1961 Grove ............................ 251/173X
3,304,050 2/1967 Fawkes .......................... 251/173X
3,399,863 9/1968 Fawkes .......................... 251/306

Primary Examiner—Henry T. Klinksiek
Attorney—Hofgren, Wegner, Allen, Steelman and McCord ABSTRACT: A valve seat means for use in a valve such as butterfly, ball, etc., valves. In one form, the seat comprises a generally V-shaped elastomeric element having a cross section defining an outer apron portion and inwardly diverging leg portions. The seat is provided with rib structures for effecting an improved interlocked association of the seat with suitable retaining material such as set plastic. In a second form, the seat comprises an elastomeric member having an outer seating portion and an inner narrow retention portion. The outer portion is provided with sealing ribs on the side surfaces thereof for improved sealing of the seat in a valve body channel.

Patented Nov. 17, 1970

Inventor:
Donald G. Fawkes
By: Hofgren, Wegner,
Allen, Stellman & McCord
Attorneys

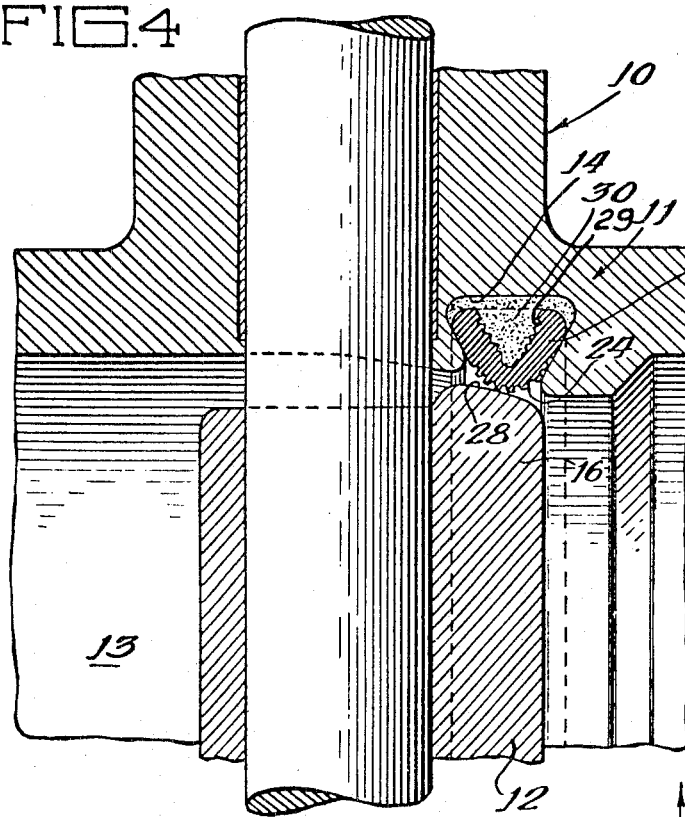
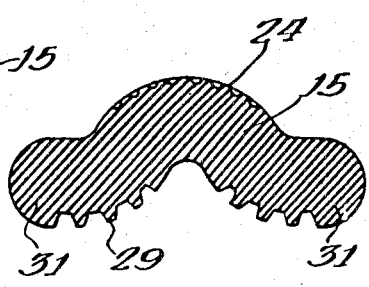
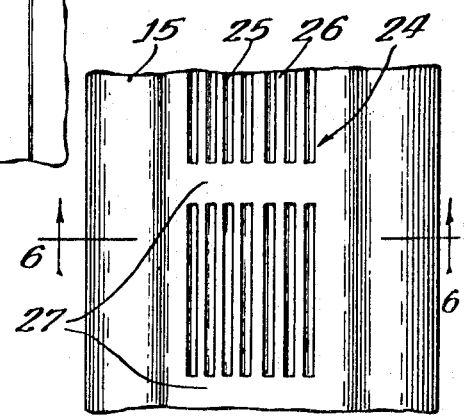
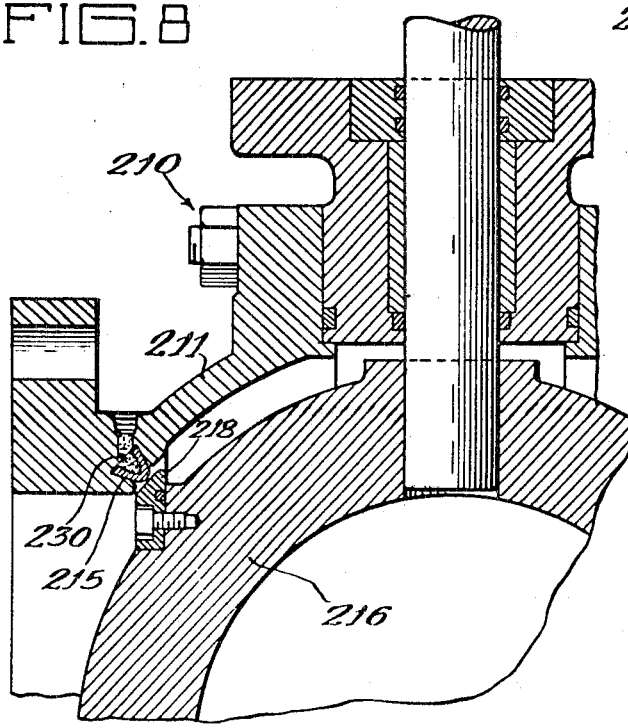
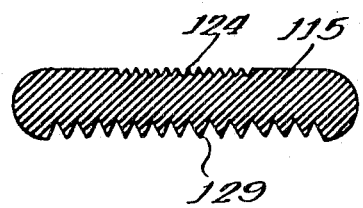

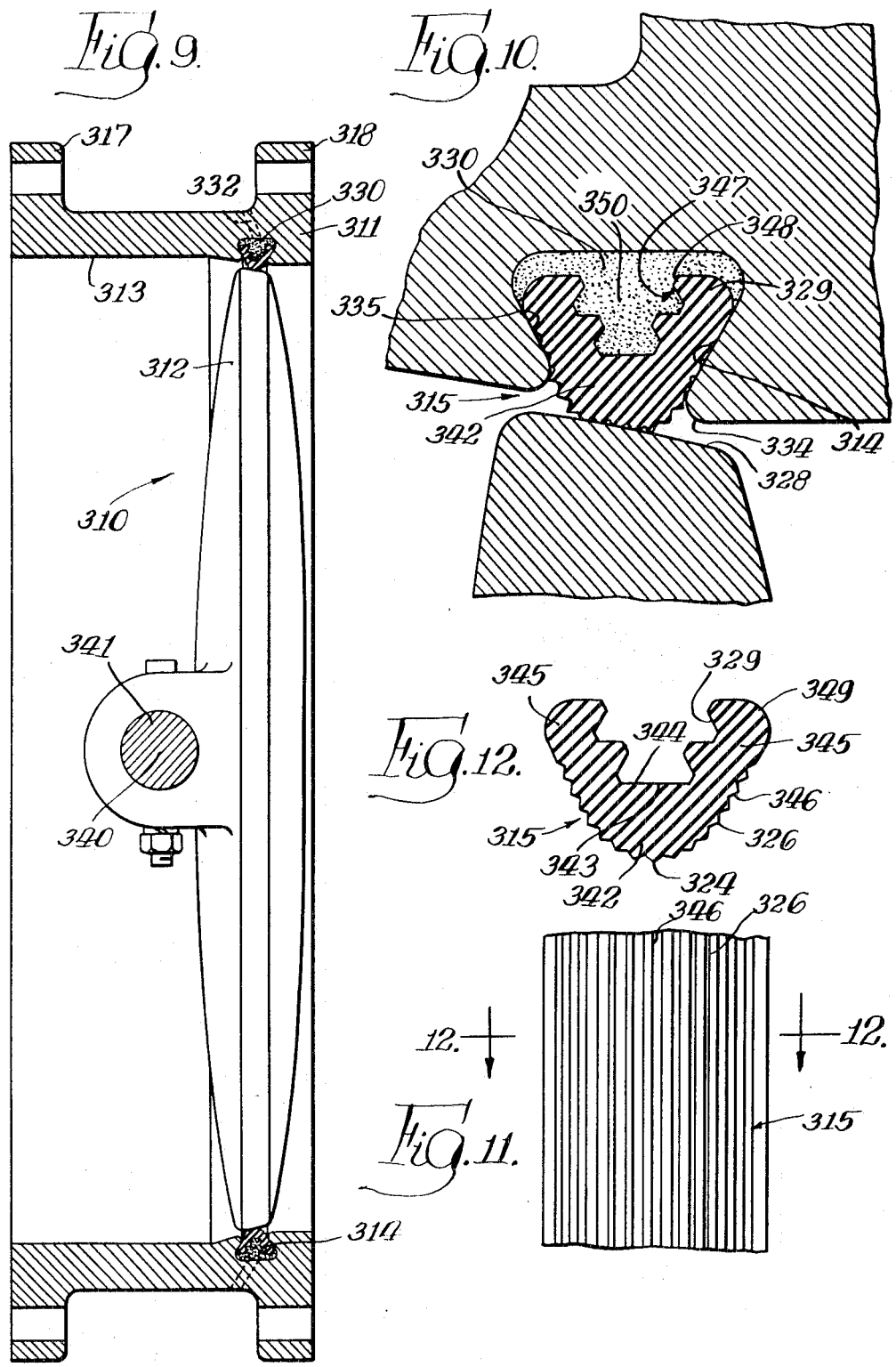

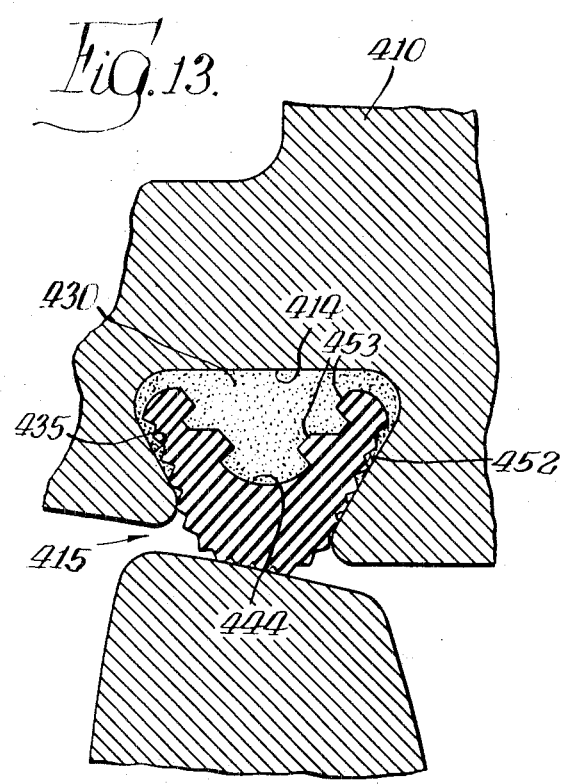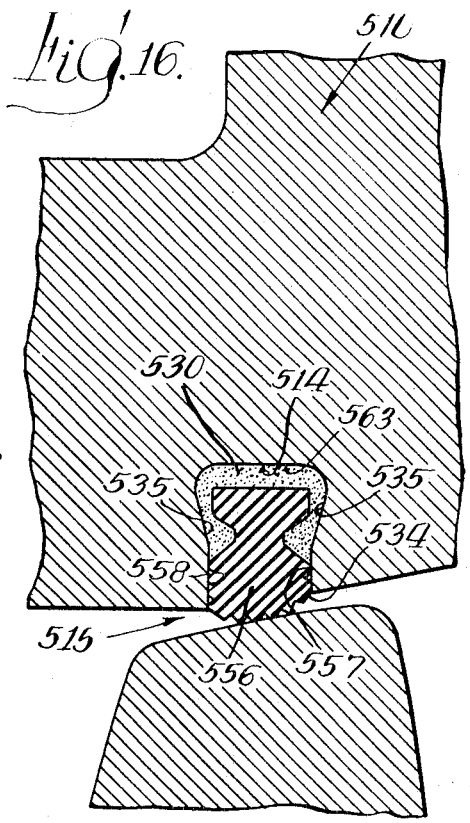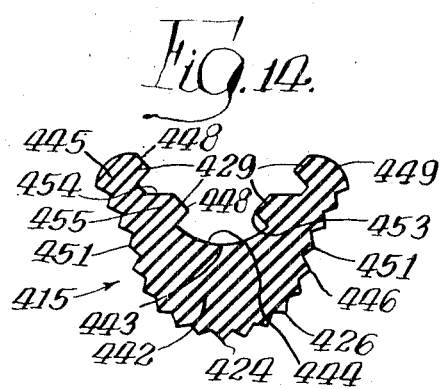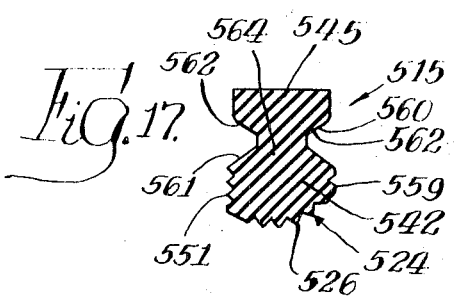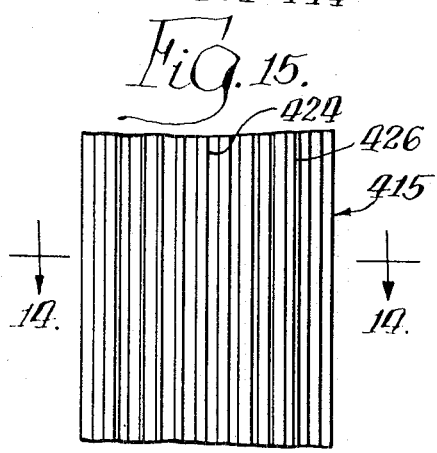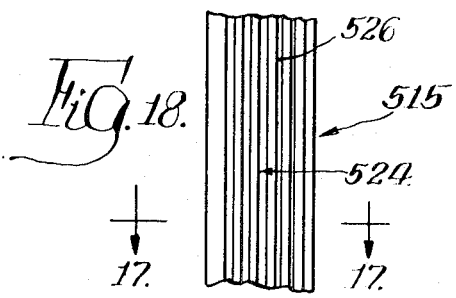

3,540,696

VALVE SEAT STRUCTURE

This application comprises a division of my copending U.S. Pat. application Ser. No. 606,649, filed Jan. 3, 1967, now U.S. Pat. No. 3,418,411, which is a continuation-in-part of my U.S. Pat. No. 3,304,050.

This invention relates to valves and in particular to valve seats for use therein.

In one well known valve construction, a movable valve member is selectively positionable to close an opening between the movable valve member and a surrounding body member. In one form of such a valve commonly called a butterfly valve, a disc is pivoted about a diameter thereof within an annular valve body so that when the flat plane of the disc is aligned with the axis of the annular body flow through the valve is permitted, and when the flat plane of the disc is arranged transversely to the axis of the body flow through the valve is effectively prevented.

In another form of valve, commonly known as a ball valve, the movable valve member comprises a ball rotatable about a diameter thereof so as to selectively dispose a bore through the ball in axial alignment with the axis of the body member in the open position of the valve and transversely thereto in the closed position of the valve. The present invention is concerned with a valve seat construction which may be provided in valves, including such butterfly and ball valves, to provide a tight seal between the valve members for effectively positively precluding leakage of fluid through the valve in the closed position.

A further feature of the invention is the provision of a valve seat having a V-shaped cross section of improved construction. The invention further comprehends the provision of a modified form of improved valve seat having a narrow inner portion adapted to be received within the valve body channel and having an outer portion provided with improved rib means. The inner portion is adapted to be interlocked with a retaining means such as a set body of plastic within the channel thereby to provide improved positive retention of the seat.

Other features and advantages of the invention will be apparent from the following description taken in connection with the accompanying drawings wherein:

FIG. 4 is an enlarged fragmentary section taken substantially along the line 4-4 of FIG. 3, but with the disc member and valve seat member as disposed in the closed position of the valve;

FIG. 5 is an elevation of a portion of the valve seat member showing the seating surface thereof;

FIG. 6 is a transverse section thereof taken substantially along the line 6-6 of FIG. 5;

FIG. 7 is a transverse section illustrating a modified form of valve seat member embodying the invention;

FIG. 8 is a fragmentary diametric section of a ball valve provided with a seat structure embodying the invention;

FIG. 9 is a diametric section of a butterfly valve provided with another form of valve seat structure embodying the invention;

FIG. 10 is a fragmentary enlarged diametric section thereof;

FIG. 11 is a plan view of the valve seat thereof;

FIG. 12 is a transverse section of the valve seat taken substantially along the line 12-12 of FIG. 11;

FIG. 13 is a fragmentary diametric section of a butterfly valve provided with still another form of valve seat structure embodying the invention;

FIG. 14 is a transverse section thereof taken substantially along the line 14-14 of FIG. 15;

FIG. 15 is a fragmentary elevation of the valve seat of FIG. 13;

FIG. 16 is a fragmentary diametric section of a butterfly valve provided with yet another form of valve seat structure embodying the invention;

FIG. 17 is a transverse section thereof taken substantially along the line 17-17 of FIG. 18; and FIG. 18 is a fragmentary elevation of the valve seat of FIG. 16.

Figure 1:
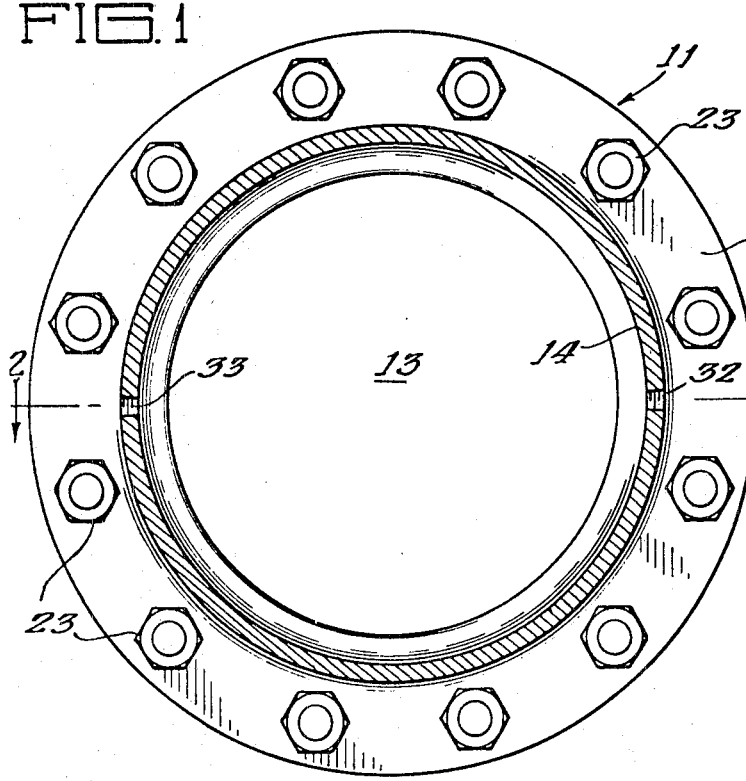
FIG. 1 is a transverse section of a butterfly valve body having a channel structure arranged for receiving a valve seat member embodying the invention.

In the exemplary embodiment of the invention as disclosed in FIGS. 1 through 6 of the drawing, a fluid flow control valve generally designated 10, herein comprising butterfly valve, includes an annular valve body generally designated 11 and a disc member generally designated 12 relatively movably associated for selectively opening and closing a passage 13 extending axially through the valve body. In the illustrated embodiment, the body is provided with an annular channel 14 opening radially inwardly and receiving a seat member 15 which is engaged by the periphery 16 of the disc 12 in the closed position of the valve for sealingly closing the passage 13 against fluid flow past the disc 12.

In the illustrative embodiment of the invention, the valve body 11 is provided at its opposite ends with outturned flanges 17 and 18 adapted to be sealingly secured to corresponding outturned flanges 19 and 20 of associated conduits 21 and 22, respectively, the flanges being secured to each other by suitable means, such as nut and bolt means 23.

Referring now more specifically to FIGS. 4 through 6, the seat member 15 comprises a resilient member formed of a suitable material such as rubber. The seating surface 24 thereof is provided with a plurality of grooves 25 spaced laterally apart to define a plurality of contact areas 26 therebetween. The grooves are interrupted at spaced intervals to define dams 27 preventing fluid flow from one group of grooves longitudinally to the next. The grooved seating surface 24, as shown in FIG. 4, has a width greater than the width of the confronting disc edge 28. However, by virtue of the reduced contact area resulting from the provision of the grooves 25 in the seating surface, the torque required to open and close the valve is substantially reduced and herein is substantially one-half that required were the seating surface 24 not provided with the grooves. Further, as the dams 27 preclude fluid flow through the groove portions, the seat member may be skewed to the axis of the valve somewhat without permitting flow of fluid from the upstream side of the valve to the downstream side of the valve. Illustratively, the valve seat may be skewed to an angle up to ±2½°.

Figure 3:
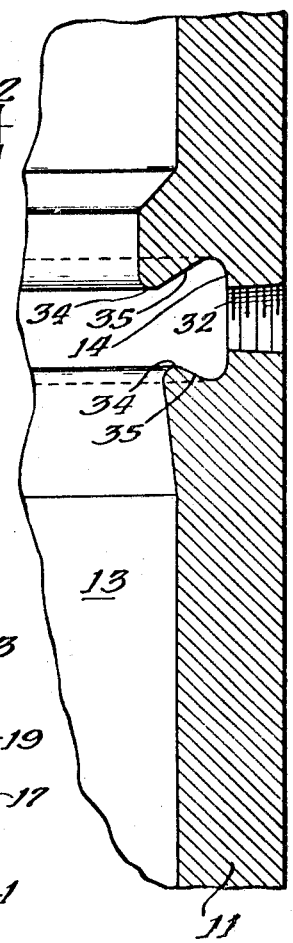
FIG. 3 is a fragmentary enlarged section of a portion of the valve as illustrated in FIG. 2.

The inner surface 29 of the seat member 15 is shown in FIG. 6 to be grooved for improved gripping coaction with a body 30 of material received in the channel 14 behind the valve seat member 15. The seat member 15 may be formed in a generally U-shaped channel configuration, as shown in FIG. 6, with outwardly extending flange portions 31. The channel 14, as best seen in FIGS. 3 and 4, is undercut so as to receive the flange portions 31 of the valve seat member therein, the flange portions being urged together during the installation of the seat member in the channel. The seat is preferably sufficiently thick to preclude blowout thereof between the body member 11 and the surface 28 of the disc 12 as a result of the fluid pressure acting against the valve seat in the space between the body member and disc surface 28.

The invention comprehends an improved seat structure wherein the body 30 of material behind the valve seat is caused to stress selectively the valve seat for adjusting the configuration of seating surface 24 to accurately conform to the disc surface 28. In such valves a problem arises in accurately conforming the disc and seat structure so as to make the valve absolutely bubbletight. In the present invention this conformity is effected by means of the body 30 which urges the resilient valve seat member 15 into positive tight engagement with the disc surface 28 along the entire extent thereof.

Figure 2:
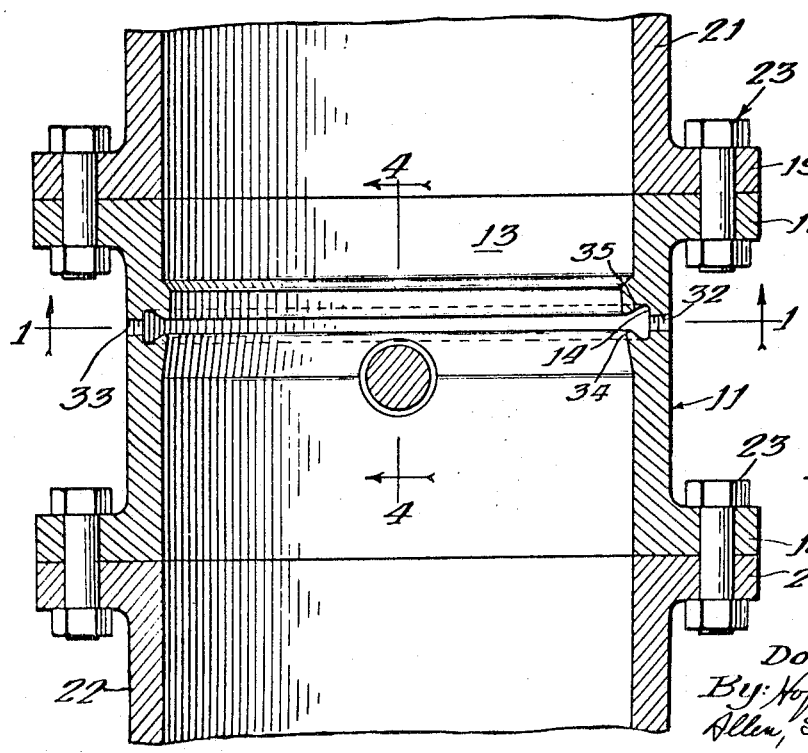
FIG. 2 is a diametric section thereof taken substantially along the line 2-2 of FIG. 1.

More specifically, body 30 comprises a set mass of plastic material which is introduced into the channel 14 behind the valve seat member 15 through a suitable inlet such as inlet 32, as shown in FIG. 2. The plastic material is caused to flow in each of the semiannular channel sections leading from the inlet 32 to the diametrically opposite side of the valve wherein is provided an outlet 33 permitting a small amount of the plastic material to pass outwardly therefrom, and thereby indicating that the channel has been completely filled with plastic material. The outlet may then be closed and pressure applied to the plastic material through the inlet so as to cause the rubber seat member 15 to be stressed outwardly into engagement with the disc surface 28 which is disposed at this time in the closed position, as shown in FIG. 6. The valve seat 15 may be originally disposed in the channel with its seating surface 24 spaced from the disc surface 28 a preselected distance, such as one-sixteenth inch. Thus, the fluid pressure acting through the plastic material 30 firstly urges the entire seat member 15 through the one-sixteenth inch gap into engagement with the disc surface. The pressure causes the seating surface to be forced against the disc surface 28, notwithstanding the fact that the disc surface 28 may not be truly circular, and may have irregularities therein. Thus, the seating surface is caused to conform to the irregularities and provide a perfect seal with the surface 28 along its entire annular extent.

The plastic material is then allowed to set in the channel 14 while the pressure thereon is maintained. Once the plastic body 30 has set, the force of fluid pressure may be removed. The disc 12 may then be selectively moved to the open position and returned to the closed position as desired, with the disc surface 28 being tightly sealed to the seat member surface 24 each time the disc is returned to the closed position as the set body 30 maintains the seat with its seating surface 24 adjusted to the configuration in which it was disposed during the setting of the plastic body 30.

The plastic body 30 illustratively may be formed of an epoxy resin capable of use at the highest temperatures at which the rubber seat member 15 may be used. Another example of a material which may be used for the plastic body 30 is polyurethane foam material. The pressure applied to the plastic material should be sufficient to cause the desired accurate conformity of the seating surface 24 with the disc surface 28 and obviously is a function of the durometer characteristic of the seat member and the pressure at which the valve is intended to function.

The plastic body 30 further serves, as indicated briefly above, to retain the seat member 15 within the channel 14 as a result of its secured engagement with the rear surface portion 29 of the seat member. Further, the pressure induced in the plastic material serves to press the flanges 31 of the seat member firmly against the body member 11 in the outer portion of the channel 14 further securing the seat member in the channel.

As best seen in FIG. 3, the outer edges 34 of the channel 14 are rounded to preclude undesirable deformation of the seat member when passed thereagainst as by fluid forces. The side walls 35 of the channel 14 are generally frustoconical and taper toward the axis of the valve at an angle of approximately 30° to a radial plane. Thus, the seat member 15 may be retained positively within the channel against the side surfaces 35 of the channel.

As the seat member 15 is adjusted relative to the disc surface 28 by means of the plastic body 30, it is unnecessary to accurately machine the channel 14 therein. Thus, the channel may be formed by simple and economical means, such as by forming the channel in the valve body during casting of the valve body.

The invention further comprehends an arrangement wherein the seat member 15 is not bonded to the set body 30. For this purpose, a suitable release agent may be applied on the rear surface 29 of the seat member. Where the rear surface 29 of the seat member is not bonded to the plastic body 30, additional material may be subsequently inserted into the cavity 14 as by introduction thereof through a hypodermic-type needle inserted through the rubber seat member 15. Such a method of introducing the plastic material to behind the seat member may be employed, for example, in the field such as in maintaining the valve where wear of the seat member occurs requiring a subsequent restressing of the seat member into sealed engagement with the disc surface 28.

Referring now to FIG. 7, a modified form of seat member 115 is shown to comprise a seat member generally similar to seat member 15 but having a generally flat section rather than the U-shaped section of seat member 15. The seat member 115 is provided with a seating surface 124 and a rear surface 129 generally similar to and functioning in a similar manner as the seating surface 24 and the rear surface 29 of the seat member 15. The seat member 115 may be used in lieu of the seat member 15, as illustrated in FIGS. 1 through 6.

Referring now to FIG. 8, a valve seat member generally designated 215, similar to valve seat member 15, is disposed in the body portion 211 of a ball valve generally designated 210 for cooperation with a sealing ring 218 carried on the ball 216 of the valve. A set mass of plastic material 230 is provided behind the seat member 215 and functions in a similar manner to the set mass 30 of valve 10 to provide accurate adjustment of the seat member to the sealing ring 218 along its entire annular extent.

Thus, the invention comprehends an improved valve seat structure wherein the seat member is caused to have accurate conformity with the valve member seating thereagainst for improved bubbletight closure of the valve. The adjustment of the seat member with the surface to have such accurate conformity is effected in a novel and simple manner by means of forces originally applied in a hydraulic manner and which are subsequently positively maintained by the setting of the fluid medium through which they act. Thus, the invention comprehends a simple and economical structure providing long trouble-free valve life and assuring optimum leakproof operation thereof.

Turning now to FIGS. 9 through 12, still another form of valve seat member generally designated 315 is illustratively provided in a butterfly valve 310. As shown in FIG. 9, valve 310 includes a disc 312 within an annular valve body 311. Disc 312 is rotatable about a vertical axis 340 on a post 341. The valve body may be provided with outturned flanges 317 and 318 similar to flanges 17 and 18 of valve 10 for mounting the valve suitably in a conduit (not shown). The disc 312 moves in the passage 313 within the body 311 to have its peripheral edge 328 sealingly engage the resilient seat member 315 disposed in an annular channel 314 in the valve body 311. A plurality of passages 332 are provided through the valve body for introducing flowable plastic material into the channel 314 behind the resilient valve seat member 315 at different positions spaced annularly about the channel.

The seat member 315 comprises an annular member formed of a resiliently distortable material such as rubber. Illustratively, the seat member may be formed of buna (N) rubber having a 65 to 70 durometer hardness.

As shown in FIG. 12, the valve seat member 315 is generally V-shaped in transverse cross section, i.e. in cross section perpendicular to the annular longitudinal extent of the seat member. Thus, the seat member includes an apex portion 342 defining a seating surface 324 provided with a plurality of triangular section ribs 326 which extend longitudinally parallel to the annular longitudinal extent of the seat member. Illustratively, where the seat member is arranged for installation in a 48 inch valve and is thusly approximately 150 inches long in angular extent, the apex portion 342 may have a five-eighth inch thickness from a center 343 of the flat internal surface 344 at the junction of the legs 345 therewith. The tips 346 of the ribs 326 may be spaced apart approximately 15°, and the height of the triangular ribs may be approximately 0.05 inch. The legs 345 may diverge from the apex portion 342 at an angle of approximately 60°. The width of the seat member, i.e. to the outside of the opposite leg portions 345 may be approximately 1 7⁄8 inch, and the height of the seat member may be approximately 1 5/16 inch. The ribs 326 may extend from the apex to the legs 345.

The legs 345 may further be provided with inturned ribs 329 which as best seen in FIG. 12 are truncatedly triangular in transverse cross section. The sidewalls 347 of the ribs 329 may converge at an angle of approximately 60° toward their truncated ends 348 and the height of the ribs may be approximately one-eighth inch. The thickness of the legs 345 may be less than the thickness of the apex portion 342 and, illustratively, may be rounded such as with a one-fourth inch radius.

The plastic material may be introduced into the bottom of the channel 314 through the inlet 332 as shown in FIG. 10 to behind the valve seat member 315. The valve seat member is placed in the channel 314 with the ribs 326 confronting the frusto-conical sidewalls 335 of the channel 314. As shown in FIG. 10, the sidewalls converge toward the outer opening 334 at an angle of approximately 60° whereby the legs 345 of the valve seat generally conform to the arrangement of the sidewalls so that the ribs 326 may bear lightly against the sidewalls 335 in the loosely installed arrangement. The plastic material may be pumped into the space 350 behind the valve member 315 within the channel 14 to urge the valve member outwardly through the opening 334 and concurrently press the ribs 326 on the legs 345 against the channel walls 335. As indicated above relative to the previously described embodiments, the valve member is thusly urged outwardly through the opening 334 into contact with the edge 328 of the valve disc. Thus, the valve seat member flexibly rearranges itself relative to the channel 314 so as to extend more or less through the opening 334 to engage the valve disc edge 328 substantially uniformly around its periphery.

THe plastic material may be provided with a suitable catalyst in an effective amount to cause the setting of the plastic material, herein an epoxy resin, after a preselected period of time sufficient to permit the valve seat to be further squeezed against the disc edge 328 by suitable pressure application to the plastic material to provide a substantially uniform compressive deformation of the seat against the disc edge 328 throughout its length. The pressure is maintained while the plastic material sets.

Thus, when the valve disc is moved to an open position away from the valve seat 315, the rubber valve seat expands inwardly from the body member 311 substantially uniformly throughout its length, and thus when the valve seat is again swung to the closed position of FIG. 10, substantially each portion of the valve seat along the length thereof is again compressed the same amount. As no portion of the valve seat is overstressed but all portions are substantially similarly uniformly stressed by the force of the valve seat thereagainst, the valve seat provides optimum long life and foolproof operation.

The triangular ribs 326 provide an improved low torque opening and closing of the valve while yet assuring positive sealed closure of the valve in the closed position. The ribs 329 cooperate with the set mass 330 to retain the valve seat against movement outwardly from the channel as the ribs 329 effectively interlock the valve seat to the plastic body, and thus the plastic body comprises effectively an integral extension of the resilient seat member locking the seat member in the channel against withdrawal through the relatively small outer opening 334. When the plastic material 330 is introduced behind the valve seat 315, the seat may be moved outwardly thereby through opening 334 sufficiently to fold legs 345 slightly toward each other and thus expose one or more ribs 326 to the space 350 in channel 314 behind the seat whereby the set plastic mass 330 may interlock further therewith to augment the locking action with ribs 326. The set plastic mass 330 is in turn locked in the channel 314 by the undercut configuration thereof. The ribs 326 engage the channel side walls during the introduction of the flowable plastic into the space 350 to effectively preclude leakage of the plastic material outwardly from the channel.

Turning now to FIGS. 13 through 15, yet another form of valve seat member generally designated 415 is provided for use in a butterfly valve generally designated 410. Valve seat 415 is generally similar to valve seat 315, but is provided with tapering legs 445. The legs are provided with outwardly projecting ribs 451 which are inset from the ribbed seating portion 442 to provide a space 452 between the legs 445 and the side walls 435 of the channel 414. Further, the inner surface 444 is rounded and the outer surface 453 of each of the internal ribs 429 is made to be perpendicular to the truncated outer surface 448 of the ribs 429. The rounded configuration of the interior of the seat defined by the rounded surface 444 permits facilitated folding of the seat legs during the insertion of the seat into the channel 414. Outer rib surfaces 453 may extend substantially perpendicular to the lengthwise extent of the legs 445 to provide further improved retention of the positive interlocking of the seat member 415 with the set plastic mass 430 in the channel 414. Still further, the tapering configuration of the legs 445 provides facilitated flexure thereof during the insertion of the seat into the channel 414 while yet the legs may provide positive retention of the seat in locked association with the set plastic mass 430.

In the illustrated embodiment, the seat portion 442 may have a thickness of approximately one-half inch with the ribs 426 of the seating surface 424 having a height of approximately 0.04 inch, and with the ribs 451 of the legs 445 having a similar height of approximately 0.04 inch. The surface 444 may be circular in cross section having an angular extent of approximately 90° and a three-eighths inch radius. The outer corners 449 may be rounded at a radius of approximately three-sixteenths inch. The ribs 451 extend along a line at an approximately 45° angle to the vertical center line of the seat member and the ribs 429 may extend along a line at an angle of approximately 30° to the vertical center line of the seat member. The ribs 429 may have a height of approximately one-eighth inch. The ribs 426 may extend about the center 443 of the surface 444 approximately 90°. The overall height of the seat member 415 may be approximately 1 inch and the width thereof approximately 1⅝ inch. The arcuate width between the ribs 426 may be approximately 15° and the width of the ribs 451 may be approximately 0.130 inch. The outer surface 454 of the outermost internal rib 455 may be approximately 45° to the surface 448.

Thus, valve construction 410 is generally similar to the construction of valves 10 and 310 and functions in substantially the same manner except for the differences noted above. Portions of valve struction 410, corresponding to similar portions of valve construction 310 are designated by similar reference numerals but 100 higher.

Turning now to FIGS. 16 through 18, still another form of valve seat member 515 is shown for use with a further modified form of valve 510. The valve seat 515 is received in a channel 514 which includes an outer portion 556 defined by parallel substantially planar side walls 557 and 558. As shown in FIG. 17, the seat member included an outer seating portion 542 and an inner retaining portion 545. The width of the retaining portion is preferably slightly less than the width of the seating portion whereby the retaining portion may be readily inserted through opening 534 of the channel 514. The seating portion 542 is provided with a series of ribs 551 along one side thereof and a plurality of ribs 559 along the other side thereof and a plurality of ribs 526 on the outer seating surface 524 thereof. The width of the unconstricted seating portion 542 between the extremities of the ribs 551 and 559 is preferably slightly greater than the width of the channel opening 534, and in the illustrated embodiment an interference therebetween of approximately 0.093 inch maximum is provided. The seat member is further defined by a pair of opposite, outwardly opening recesses 560 and 561, each provided with an inner angular surface 562. Thus, as shown in FIG. 16, the set plastic mass 530 may extend fully about the retaining portion 545 with the surfaces 562 providing a positive mechanical interlocking of the portion 545 with the set mass to retain the valve seat in the channel 514. The fit of the ribs 551 and 559 against the straight side walls 557 and 558 effectively precludes the loss of fluid plastic therepast during the introduction of the fluid plastic material into the channel 514 in the initial steps of adjusting and compressing the seat as discussed above relative to the preceding disclosed embodiments. The clearance between the retaining portion 545 and the walls of the channel in the inner space 550 of the channel 514 may be increased by providing frusto-conical sidewalls 535 therein which widen inwardly to provide the maximum lateral cross section of the space 550 adjacent the bottom surface 563 of the channel. Thus, the plastic material may be flowed readily uniformly about the retaining portion 545 of the seat member 515 to eliminate voids and provide effective mechanical interlocked association of the valve seat with the valve body throughout the length thereof.

In the illustrated embodiment, the width of the seating portion 542 may be approximately .813 inch and the width of the retaining portion 545 may be approximately twenty-three thirty-seconds inch. The height of the seat member 515 may be approximately 1 inch. The depth of the recess 562 relative to the retaining portion 545 may be approximately five thirty-seconds inch. The extent of the ribs 551 may be approximately five-sixteenths inch and the extent of the ribs 559 may be approximately three-sixteenths inch. The ribs 526 may extend in annular relationship about a center 564 at a radius of approximately seventeen thirty-seconds inch. The ribs 526 may be approximately 0.040 inch deep. The ribs 551 may be approximately three sixty-fourths inch deep, and the ribs 559 may be approximately three sixty-fourths inch deep. The height of the retaining portion outwardly to the surfaces 562 may be approximately three-sixteenths inch. Illustratively, the channel 514 may be approximately forty-nine sixty-fourths inch deep at the sidewall 557 and approximately 1 1/16 inch deep at the sidewall 558. The maximum width of the channel between the sidewalls 557 and 558 may be approximately 0.750 inch, the depth of sidewall 557 may be approximately nine sixty-fourths inch and the depth of sidewall 558 may be approximately seven-sixteenths inch. The sidewalls 535 may extend at an angle of approximately 15° to the plane of the sidewalls 557 and 558 respectively. The channel 514 may be provided with inner rounded corners 565 having a radius of approximately three-sixteenths inch.

Thus, valve seat 515 is similar to and functions in a manner generally similar to valve seat 15, except for the differences discussed above. Similar elements of a valve structure 510 corresponding to similar elements of valve structure 10 are identified by similar reference numerals but 500 higher.

Thus, each of valve seats 15, 115, 215, 315, 415 and 515 provides an improved structure wherein effectively positive closure of the valve is effected with minimum torque and with effectively maximum life and minimum maintenance.

I claim:

1. A valve seat comprising an elongated member adapted to be received in an annular channel, said member being formed of an elastomeric material and having a generally V-shaped transverse section defining an outer apex portion and inwardly diverging leg portions, said leg portions being provided with a plurality of laterally outwardly projecting spaced ribs extending parallel to the longitudinal extent of the seat member.

2. The valve seat of claim 1 wherein said ribs are triangular in transverse section.

3. The valve seat of claim 1 wherein said leg portions are provided with spaced inturned ribs extending parallel to the lengthwise extent of the seat member.

4. The valve seat of claim 3 wherein said ribs are truncatedly triangular in transverse section.

5. The valve seat of claim 1 wherein said leg portions are provided with spaced outturned ribs extending parallel to the lengthwise extent of the seat member.

6. The valve seat of claim 1 wherein said apex is thicker than said leg portions.

7. The valve seat of claim 1 wherein said apex is provided with a plurality of outwardly projecting spaced ribs extending parallel to the longitudinal extent of the seat member and said leg portions are provided with spaced inturned ribs extending parallel to the lengthwise extent of the seat member, the ribs on said leg portions having a greater projection from said leg portions than the projection of said ribs on said apex therefrom.

8. The valve seat of claim 1 wherein said member has a lateral width greater than the inner-outer height thereof.

9. The valve seat of claim 1 wherein said member has a lateral width of approximately 1⅜ inch and and an inner-outer height of approximately 1 5/16 inch.

10. The valve seat of claim 9 wherein said apex has an inner-outer thickness of approximately five-eighths inch.

11. The valve seat of claim 1 wherein said leg portions taper inwardly away from said apex portion.

12. The valve seat of claim 1 wherein the inner surface of the apex portion is inwardly concave.

13. The valve seat of claim 1 wherein said leg portions are provided with outwardly facing shoulders extending substantially perpendicularly to the inwardly lengthwise extent of said leg portions.

14. The valve seat of claim 1 wherein said leg portions define rounded distal inner ends.

15. The valve seat of claim 1 wherein said member is formed of rubber.

16. A valve seat comprising an elongated member adapted to be received in an annular channel, said member being formed of an elastomeric material and having an outer seating portion and an inner retention portion, said outer portion being provided with side surfaces defining a plurality of sealing ribs, and said inner portion having a lateral width less than the lateral width of said outer portion.

17. The valve seat of claim 16 wherein said outer portion defines an outer seating surface having outwardly projecting ribs extending parallel to the longitudinal extent of the seat member.

18. The valve seat of claim 17 wherein said ribs are asymmetrically located relative to the inner-outer centerline of the seat member.

19. The valve seat of claim 16 wherein said side surfaces extend substantially parallel to the inner-outer centerline of the seat member.

20. The valve seat of claim 16 wherein said outer portion is asymmetrical relative to the inner-outer centerline of the seat member.

21. The valve seat of claim 16 wherein said outer portion is defined in part by a ribbed surface and in part by a nonribbed surface.

22. THe valve seat member of claim 16 wherein said member is formed of rubber.